Patented Feb. 24, 1931

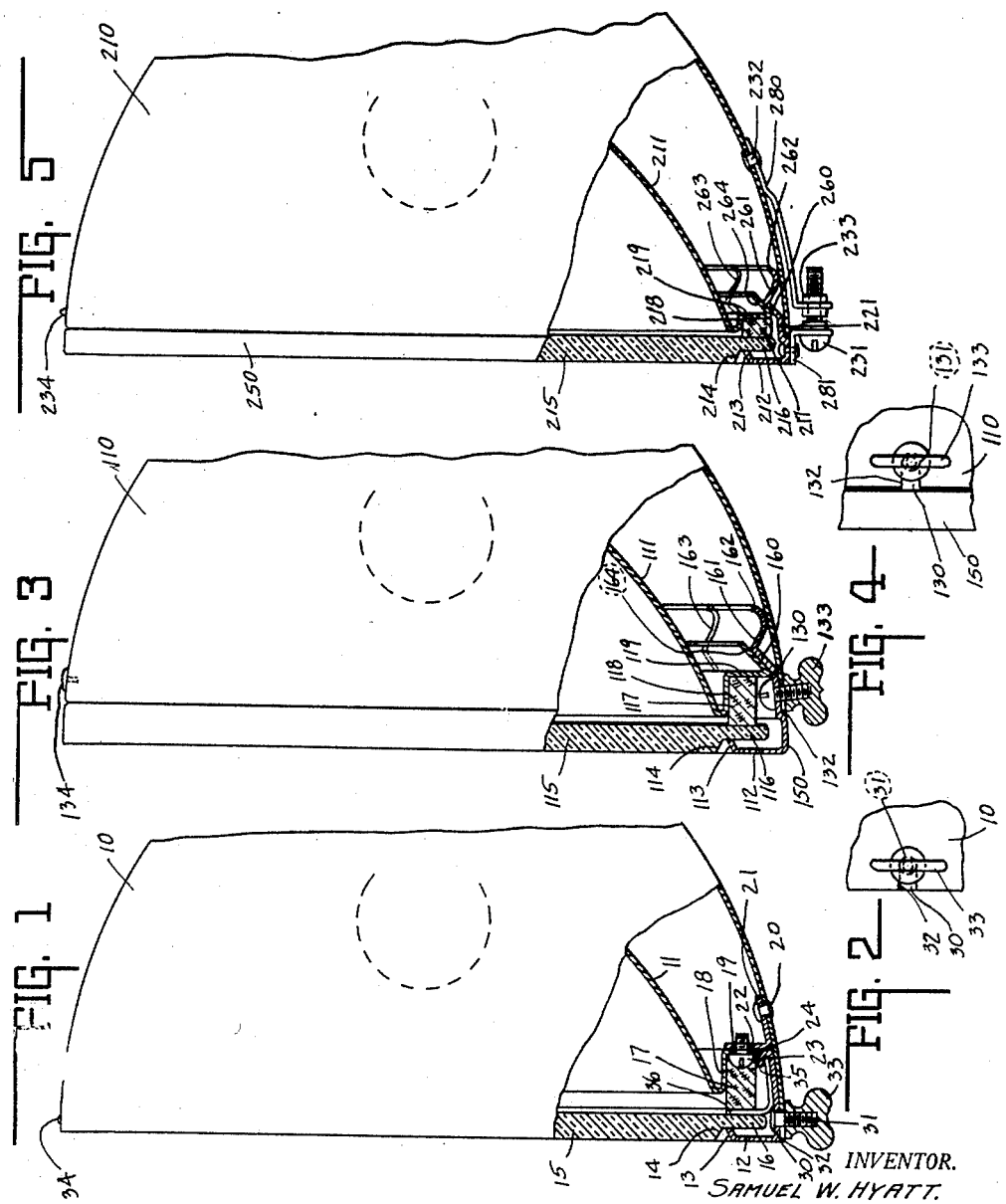

1,793,805

UNITED STATES PATENT OFFICE

SAMUEL W. HYATT, OF CONNERSVILLE, INDIANA, ASSIGNOR TO INDIANA LAMP CORPORATION, OF CONNERSVILLE, INDIANA

INTERIOR-TELESCOPING-RIM HEAD LAMP

Application filed January 16, 1930. Serial No. 421,086.

This invention relates to a headlamp construction wherein the door rim and casing have a detachable connection.

The chief object of the invention is to provide a headlamp construction with a casing and door rim, the latter being telescopically receivable by the former to permit full telescoping of the rim by the casing if and when desired, thereby eliminating lateral and peripheral exposure of all or the larger portion of the usual door rim construction.

The chief feature of the invention consists in providing a connection as aforesaid which accomplishes the object noted and which may be further arranged so that the closure for the rim is relatively permanently connected to said rim and removable with the reflector as a unitary device in certain instances.

The full nature of the invention will be understood from the accompanying drawings and the following description and claims.

In the drawings Fig. 1 is a side elevational view of one embodiment of the invention, parts being broken away to show the same and other parts in central section. Fig 2 is an end view of a portion of the rim and casing connection shown in section in Fig. 1. Fig. 3 is a view similar to Fig. 1 and of a modified form of the invention. Fig. 4 is an elevational view of the rim and casing connection shown in Fig. 3. Fig. 5 is a view similar to Figs. 1 and 3 of another modified form of the invention.

In the drawings 10 indicates a casing, 11 a reflector, 12 a door rim having in-turned flange 13 defining an aperture which receives the bevelled projecting portion 14 of the closure 15. Said lens closure has a peripheral flange 16 that extends substantially parallel to the body portion 12 of the door rim. An annular sealing gasket 17 is interposed between the reflector and closure and the reflector includes a rearwardly directed annular flange 18 which terminates in a radially disposed wall 19, said flange 18 and wall 19 forming an annular seat for the inner and rearward faces of the annular sealing member 17.

In Fig. 1 the casing supports as at 20 an angular clip 21 having the threaded aperture 22 therein for receiving the threaded bolt 23 extending through a similar aperture 24 in the wall 19 of the reflector. In this manner and in this embodiment of the invention, the reflector is rigidly mounted upon the casing. The door rim includes an inwardly directed portion 30 which supports a radially projecting screw bolt 31. The casing is radially slotted as at 32 to permit lateral movement of the bolt in the nesting of the door rim within the casing. A winged nut 33, together with suitable mechanism indicated generally at 34, serves to align and maintain in lamp formation the closure and casing.

The inwardly directed annular portion 30 of the rim terminates in an inwardly and forwardly turned portion 35, the same forming a groove with said portion to seat therein an angular clip 36 that bears against the lens closure and yieldingly locks the lens closure in the door rim so that the rim and closure may be removable as a unit.

Inward telescopic movement of the rim is prevented either by the limit of compression of the sealing gasket 17 or by the groove forming portion of said rim engaging the angular bracket 21 as a stop.

The resulting construction, therefore, consists of a full circumferential rim, a full circumferential gasket and a full circumferential reflector formed gasket seat telescopically receivable within and in this instance fully receivable within a lamp casing. The aforesaid construction eliminates the finishing by plating, polishing enameling or the like, of the inwardly directed portion 30 of the rim and full peripheral seal is obtained between the several parts hereinbefore mentioned.

In Fig. 3 a modified form of the invention is illustrated and in this form the casing 110 is illustrated provided with the cooperating portion 134 for locking and maintaining in locked position the door rim construction including the in-turned aperture defining portion 113, the front or face portion 112 and the inwardly directed portion 130 telescopically receivable by the casing 110.

In the present form of the invention the rim is shown provided with a peripheral bead portion 150 that is laterally exposed by the casing and which will be finished by plating or otherwise to conform preferably with the face portion 112 of the ring. The casing is radially slotted as at 132 and radially receives the bolt 131 carried by the telescopic portion 130 of the rim. The usual wing nut 133 maintains the rim casing and associated parts in headlamp formation.

The closure 115 includes the bevelled edge 114 associated with the in-turned flange 113 of the rim and the closure includes the lateral flange portion 116.

The reflector 111 includes the rearwardly directed peripheral flange 118 provided with the radial wall 119, said flange 118 and wall 119 forming the seat for the gasket 117, which in the present instance bears directly against the closure 115.

In this form of the invention the reflector, rim and closure are removable as a unit from the casing and thereafter may be separated for bulb replacement in the usual lamp socket provided in the headlamp construction. In the present form of the invention the door rim telescopic extension 130 includes an inclined inwardly and rearwardly directed ledge portion 160 which then extends rearwardly and outwardly as at 161 and thence inwardly in curved formation as at 162. The angular flange portions of the rim are split as at 163.

The arrangement is such that a wedging action takes place between the inclined rearwardly and inwardly directed flange 164 carried by flange 119 of the reflector and the inclined flange portion 160 of the door rim so that full peripheral seal will always be maintained between the closure and the reflector when the rim is mounted within the casing.

Upon removal of the rim and reflector structure from the casing by releasing the clamping nut 133 and axially separating the before mentioned parts, then the portions 160, 161 and 162 of the door rim separate from each other at the slot 163 and such separation is sufficient to enlarge the diametrical opening in the rearward extension of the rim to permit axial separation of the reflector from the door rim in order to obtain access to the socket for light bulb replacement. But when the rim and reflector are associated together and the rim is nested within the casing all of the parts are fully sealed and the several separated portions are in substantial abutment forming full peripheral wedging and sealing engagement.

In Fig. 5 a modified form of the aforesaid invention is illustrated and in this figure the casing 210 mounts at 232 a strap 280 that terminates in a threaded nut portion 233 that receives a threaded portion of the bolt 231 supported by an angle bracket 281 carried by the peripheral portion 250 of the door rim having the front face 212 and the inwardly directed aperture defining flange 213 that bears against the extension 216 of the closure 215 having the bevelled portion 214 at the junction thereof. Back of said closure is the sealing gasket 217 seatable in the groove formed by the annular extensions 218 and 219 of the reflector 211. The reflector in this form of the invention includes the rearwardly and inwardly directed extension 264 that is inclined and bears upon a similarly inclined portion 260 which is connected to the exposed portion 250 by the telescopic portion 221. The inclined portion 260 has the rearwardly and outwardly directed portion 261 terminating in the in-turned end 262. The several inclined portions of the rim are laterally slotted as at 263. The operation of the device is substantially that set forth relative to the modification shown in Figs. 3 and 4 except that in this instance the casing is not slotted and the head of the bolt is not inclosed. With these exceptions the modification shown in Fig. 5 is identical with that before mentioned.

The invention claimed is:

1. In a headlamp, a casing, a door rim having a peripheral flange projecting rearwardly therefrom to engage and snugly fit within the forward end of said casing, a reflector within said casing, a radially disposed wall formed on said reflector near the forward edge thereof, a peripheral ledge portion inwardly and rearwardly inclined from said flange, a similar ledge portion on said radial wall engaging said former ledge portion and causing a wedging action therewith when the said rim has reached the limit of its movement inwardly of the casing, and a clamp connection holding the rim and the casing together.

2. In a headlamp, a casing, a door rim having a peripheral flange projecting rearwardly therefrom to engage and snugly fit within the forward end of said casing, a reflector within said casing, a radially disposed wall formed on said reflector near the forward edge thereof and having its outer edge spaced slightly from said casing, a ledge portion inwardly and rearwardly inclined from the said outer edge, a peripheral ledge portion inwardly and rearwardly inclined from said flange, said ledge portions adapted to engage in wedging relation with each other when the rim has reached the limit of its movement inwardly of the casing, the ledge portion of said rim being split to permit of the expansion and contraction thereof, and means for holding the rim and casing together.

In witness whereof, I have hereunto affixed my signature.

SAMUEL W. HYATT.